United States Patent
Schmuck et al.

(10) Patent No.: US 9,706,275 B2
(45) Date of Patent: Jul. 11, 2017

(54) METHOD AND APPARATUSES FOR PERFORMING NETWORK FUNCTIONS IN A PASSIVE OPTICAL NETWORK

(75) Inventors: Harald Schmuck, Schwieberdingen (DE); Michael Straub, Maulbronn (DE); Thomas Pfeiffer, Stuttgart (DE); Jörg Hehmann, Weil der Stadt (DE)

(73) Assignee: Alcatel Lucent, Boulogne-Billancourt (FR)

( * ) Notice: Subject to any disclaimer, the term of this patent is extended or adjusted under 35 U.S.C. 154(b) by 31 days.

(21) Appl. No.: 13/695,747

(22) PCT Filed: Apr. 11, 2011

(86) PCT No.: PCT/EP2011/055631
§ 371 (c)(1),
(2), (4) Date: Nov. 1, 2012

(87) PCT Pub. No.: WO2011/144388
PCT Pub. Date: Nov. 24, 2011

(65) Prior Publication Data
US 2013/0045013 A1 Feb. 21, 2013

(30) Foreign Application Priority Data
May 20, 2010 (EP) .................... 10305537

(51) Int. Cl.
*H04J 14/00* (2006.01)
*H04L 12/26* (2006.01)
(Continued)

(52) U.S. Cl.
CPC ..... *H04Q 11/0067* (2013.01); *H04L 12/2419* (2013.01); *H04L 12/2424* (2013.01);
(Continued)

(58) Field of Classification Search
CPC ............ H04L 12/2419; H04L 12/2424; H04Q 11/0067; H04Q 11/0062; H04Q 2011/009; H04Q 2011/0079
See application file for complete search history.

(56) References Cited

U.S. PATENT DOCUMENTS

| 2008/0253771 A1 | 10/2008 | Noel et al. |
| 2008/0279105 A1 | 11/2008 | Absillis et al. |

(Continued)

FOREIGN PATENT DOCUMENTS

| CN | 101675615 A | 3/2010 |
| WO | WO-2008137614 A1 | 11/2008 |

OTHER PUBLICATIONS

International Search Report PCT/ISA/210 for International Application No. PCT/EP2011/055631 dated May 4, 2011.
(Continued)

*Primary Examiner* — Shi K Li
*Assistant Examiner* — Mina Shalaby
(74) *Attorney, Agent, or Firm* — Harness, Dickey & Pierce, P.L.C.

(57) ABSTRACT

The invention relates to a method for performing network functions for a subscriber-sided (CPE) network access unit (ONT) in a telecommunication's access network with a central unit (CO, OLT), a distribution network (AN), and a multiple of network-sided network termination units (DPD) with subscriber-sided network access units (ONT) connected or connectable thereto, in which network a bidirectional communication path (1) is present between the central unit (CO) and that network-sided network termination unit (DPD), to which the subscriber-sided network access unit (ONT) under consideration is connected, in which for performing network functions a further bidirectional communication path (2) between the subscriber-sided network access unit (ONT) under consideration and the correspond- (Continued)

ing network-sided network termination unit (DPD) is used in connection with the bidirectional communication path (1) between the central unit (CO, OLT) and that network-sided network termination unit (DPD), as well as to a telecommunication's access network (FIG. 1), a central unit (CO, OLT), a network-sided network termination unit (DPD), and a subscriber-sided network access unit (ONT).

25 Claims, 2 Drawing Sheets

(51) Int. Cl.
  *H04Q 11/00*  (2006.01)
  *H04L 12/24*  (2006.01)
(52) U.S. Cl.
  CPC ... *H04Q 11/0062* (2013.01); *H04Q 2011/009* (2013.01); *H04Q 2011/0079* (2013.01)

(56) References Cited

U.S. PATENT DOCUMENTS

| | | |
|---|---|---|
| 2009/0024725 A1 | 1/2009 | Bernard et al. |
| 2009/0268606 A1 | 10/2009 | DeLew et al. |
| 2009/0269063 A1* | 10/2009 | Bernard ............... H04B 10/272 398/66 |
| 2009/0313476 A1* | 12/2009 | Liu et al. ...................... 713/182 |
| 2010/0014854 A1* | 1/2010 | Healey et al. .................. 398/16 |

OTHER PUBLICATIONS

Written Opionion of International Searching Authority PCT/ISA/237 for International Application No. PCT/EP2011/055631 dated May 4, 2011.

* cited by examiner

METHOD AND APPARATUSES FOR PERFORMING NETWORK FUNCTIONS IN A PASSIVE OPTICAL NETWORK

FIELD OF THE INVENTION

The invention relates to a method for performing network functions for a subscriber-sided network access unit in a telecommunication's access network with a central unit, a distribution network, and a multiple of network-sided network termination units with subscriber-sided network access units connected or connectable thereto, in which network a bidirectional communication path is present between the central unit and that network-sided network termination unit, to which the subscriber-sided network access unit under consideration is connected.

The invention further relates to a telecommunication's access network with a central unit, a distribution network, and a multiple of network-sided network termination units with subscriber-sided network access units connected or connectable thereto, in which network a bidirectional communication path is present between the central unit and that network-sided network termination unit, to which the subscriber-sided network access unit under consideration is connected.

The invention further relates to a central unit for a telecommunication's access network with a central unit, a distribution network, and a multiple of network-sided network termination units with subscriber-sided network access units connected or connectable thereto, in which network a bidirectional communication path is present between the central unit and the network-sided network termination unit.

The invention further relates to a network-sided network termination unit for a telecommunication's access network with a central unit, a distribution network, and a multiple of network-sided network termination units with subscriber-sided network access units connected or connectable thereto, in which network a bidirectional communication path is present between the central unit and the network-sided network termination unit.

The invention further relates to a subscriber-sided network access unit for a telecommunication's access network with a central unit, a distribution network, and a multiple of network-sided network termination units with subscriber-sided network access units connected or connectable thereto, in which network a bidirectional communication path is present between the central unit and that network-sided network termination unit, to which the subscriber-sided network access unit is connected.

BACKGROUND

Both, optical and wireless access networks normally are point-to-multipoint networks. Each customer has a connection point, where he or she can connect whatever customer premises equipment like simple telephones, servers, or multimedia devices. Such connecting of equipment is being done by the customer himself or herself and can also be changed at whatever time. There is a need to register the used equipment in the central office of the network operator and to unambiguously assign it to a customer's service contract.

To this end it is known that the customer performs a certain procedure, in the course of which a code received from the operator is to be entered. Such registration procedure is time consuming, cumbersome and error-prone.

The invention deals with the problem of providing a method and respective devices to assign a customer premises equipment to a subscriber's data record registered in the central office or other central unit of the network operator.

SUMMARY

This problem according to the invention is solved by a method for performing network functions for a subscriber-sided network access unit in a telecommunication's access network with a central unit, a distribution network, and a multiple of network-sided network termination units with subscriber-sided network access units connected or connectable thereto, in which network a bidirectional communication path is present between the central unit and that network-sided network termination unit, to which the subscriber-sided network access unit under consideration is connected, whereby for performing network functions a further bidirectional communication path between the subscriber-sided network access unit under consideration and the corresponding network-sided network termination unit is used in connection with the bidirectional communication path between the central unit and that network-sided network termination unit.

This problem according to the invention further is solved by a telecommunication's access network with a central unit, a distribution network, and a multiple of network-sided network termination units with subscriber-sided network access units connected or connectable thereto, in which network a bidirectional communication path is present between the central unit and that network-sided network termination unit, to which the subscriber-sided network access unit under consideration is connected, whereby for performing network functions a further bidirectional communication path between the subscriber-sided network access unit under consideration and the corresponding network-sided network termination unit is foreseen in connection with the bidirectional communication path between the central unit and that network-sided network termination unit.

This problem according to the invention further is solved by a central unit for a telecommunication's access network with a central unit, a distribution network, and a multiple of network-sided network termination units with subscriber-sided network access units connected or connectable thereto, in which network a bidirectional communication path is present between the central unit and the network-sided network termination unit, whereby the central unit includes communication means for operating a bidirectional communication path to a subscriber-sided network access unit via a network-sided network termination unit, to which said subscriber-sided network access unit is connected or connectable.

This problem according to the invention further is solved by a network-sided network termination unit for a telecommunication's access network with a central unit, a distribution network, and a multiple of network-sided network termination units with subscriber-sided network access units connected or connectable thereto, in which network a bidirectional communication path is present between the central unit and the network-sided network termination unit, whereby the network-sided network termination unit includes communication means for operating a bidirectional communication path to a subscriber-sided network access unit connectable thereto.

This problem according to the invention further is solved by a subscriber-sided network access unit for a telecommunication's access network with a central unit, a distribution network, and a multiple of network-sided network termination units with subscriber-sided network access units connected or connectable thereto, in which network a bidirectional communication path is present between the central unit and that network-sided network termination unit, to which the subscriber-sided network access unit is connected, whereby the subscriber-sided network access unit includes communication means for operating a bidirectional communication path to a network-sided network termination unit connectable thereto.

The invention adds to the already existing end-to-end (high capacity) communication path between the central office and the subscriber premises equipment and to the also already existing (low capacity) communication path between the central office and the demarcation point unit a further (low capacity) communication path between the demarcation point unit and the subscriber premises equipment. By this a (low capacity) communication path is provided between the central office and a subscriber premises equipment that can be used for operation and maintenance purposes and is unambiguously assigned to one subscriber premises location.

The use of such communication path of course is not restricted to any special use like the unambiguous assignment of equipment.

The invention makes use of two circumstances:

On the one hand network operators often insist on terminating their network with each customer by a device being separated from any customer's devices and being in their own responsibility. It is known also that such units, then called demarcation point units, also are being unambiguously identifiable from the central office. Such demarcation point units are installed under the responsibility of the network operator, who thus knows the customer in whose location such demarcation point unit is installed. The classical network terminating element called network termination thus is separated into two parts. One part, the optical network termination, physically is terminating the network, but is in the responsibility of the subscriber; the other part, the demarcation point unit, is terminating the responsibility of the operator.

On the other hand in such cases often exist simple communication protocols for communicating with low capacity between the central office and such demarcation point units independent from the useful communication's paths ending at the subscriber premises equipment.

Further embodiments of the invention are to be found in the subclaims and in the following description.

BRIEF DESCRIPTION OF THE FIGURES

In the following the invention will be described with the aid of the accompanying drawings.

DESCRIPTION OF THE EMBODIMENTS

The invention here is described based on an optical access network as an example. In other networks like wireless access networks the application of this invention is not excluded.

Figure 1:
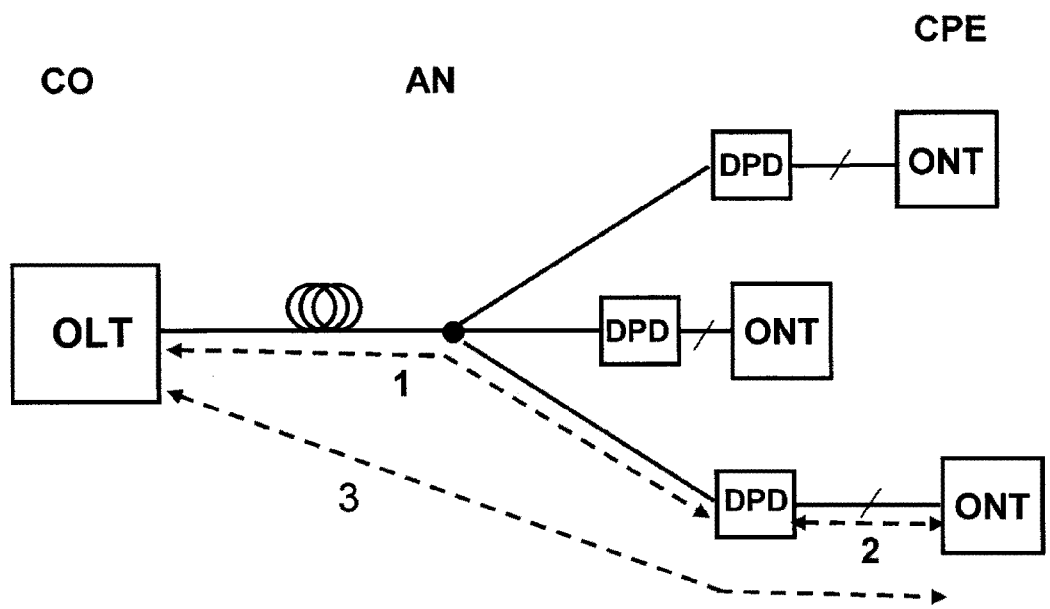
FIG. 1 shows a telecommunication's access network according to the invention that includes a central unit according to the invention, network-sided network termination units according to the invention, and subscriber-sided network termination units according to the invention, and in which a method for performing network functions according to the invention can be carried out.

The telecommunication's access network illustrated in FIG. 1 shows three main areas, namely the area of the central office CO, the area of the mere access network AN, and the area of the consumer premises equipment CPE.

The equipment in the central office considered here in the optical field commonly is called Optical Line Termination OLT.

The optical access network AN mainly consists of optical fibers and optical splitters. In addition thereto also active elements like amplifiers or regenerators could be present. Independent from the presence of such active elements such network commonly is called a Passive Optical Network PON.

In the area of the consumer premises equipment CPE for each customer we have both, a device in the responsibility and under the sole control of the network operator, called Demarcation Point Device or demarcation point unit DPD, and a device in the responsibility of the customer, commonly called Optical Network Termination ONT.

In addition to the communication paths for the end-to-end communication, here represented by the drawn-through lines, it is already known to have auxiliary bidirectional data paths with low capacity between the optical line termination OLT in the central unit or central office CO and the demarcation point devices DPD in the area of the customer premises equipment. One of which here is depicted as a dashed line and marked as "1". According to the invention now a further such auxiliary data path 2 between the demarcation point device DPD and the optical network termination ONT of this customer or subscriber is shown, also depicted as a dashed line. Both such auxiliary data paths together form an end-to-end auxiliary data path 3, also depicted as a dashed line.

As the demarcation point unit DPD is under the sole control of the network operator, a clear assignment of this demarcation point unit DPD to a customer premises is given. This can be used to unambiguously assign a customer's equipment to a customer premises. Thus on connecting such equipment, on the network operator's side it is possible to check via this auxiliary data path 3, whether such connecting is compatible with the contract or tariff the customer has with this operator. Equipment connected in such a manner thus will be clearly assigned to such customer by the operator. For further operation between this customer premises equipment and the network operator subsequently the "normal" high-capacity end-to-end data path can be used.

Such auxiliary data path 2 alone or 3 as a whole can also be used to execute whatever additional functionalities like advanced access functionalities or network functionalities, like allocating ports, addresses or physical paths within the network, revoking access authorization in case of malpractice, temporary access of unknown users to the network, e.g. by using a special access code, sending an emergency call from unknown equipment.

Even the use of this path for some kind of a short message service is possible.

Figure 2:
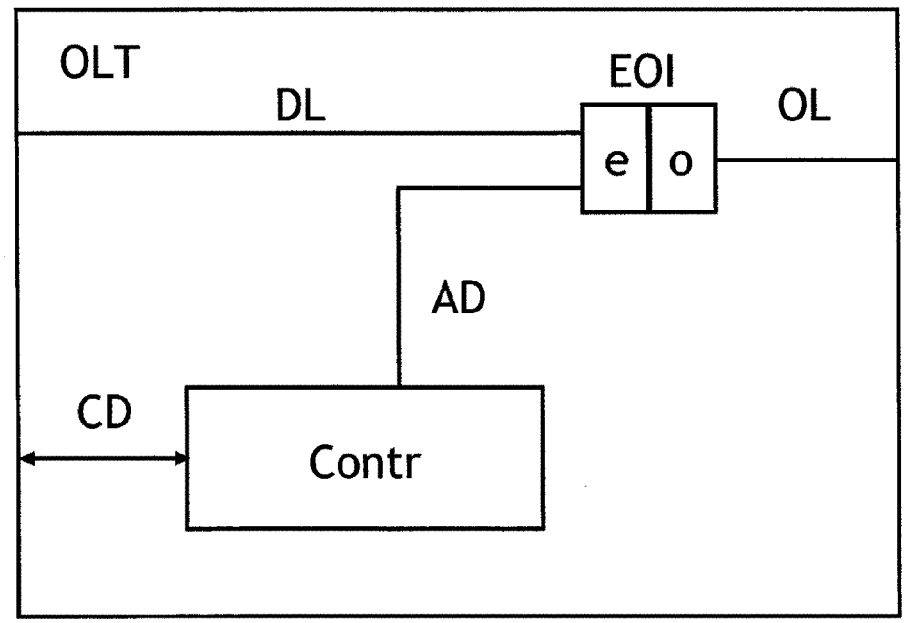
FIG. 2 shows a block diagram of a central unit according to the invention.

An example of an optical line termination OLT here representing the central office CO is now described in connection with FIG. 2. FIG. 2 shows the optical line termination OLT as mainly including a bidirectional electrical-to-optical interface EOI and a control element Contr.

FIG. 2 further shows a data line DL, an optical line OL, a path for control data CD, and a path for auxiliary data AD.

Apart from the functionality implemented in the control element Contr there is no difference to an optical line termination OLT in an access network without the additional auxiliary data path 2 (and 3).

Figure 3:
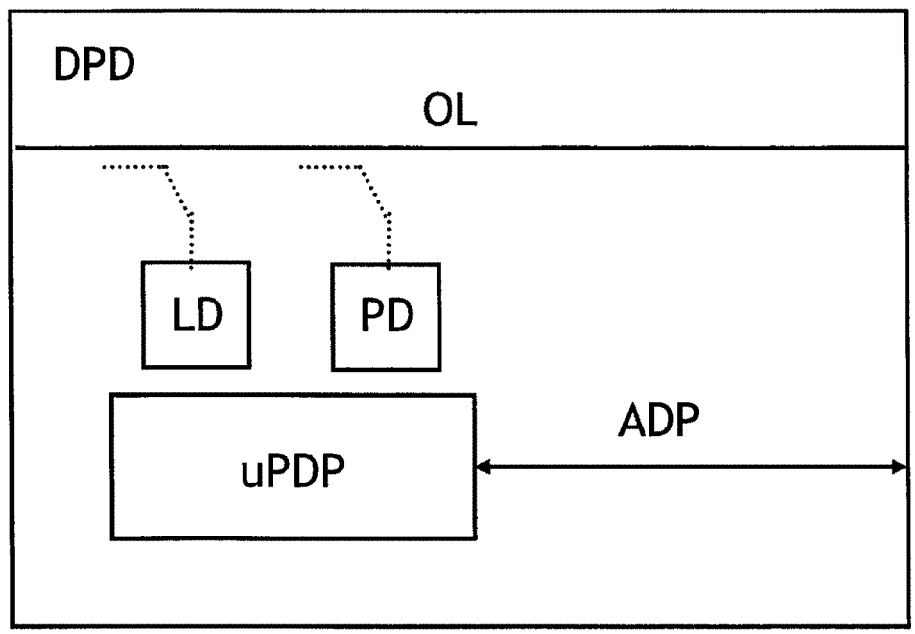
FIG. 3 shows a block diagram of a network-sided network termination unit according to the invention.

The network-sided network termination unit or demarcation point device DPD shown in FIG. 3 mainly includes a passing through optical line OL and a control element uPDP. A laser diode LD and a photo diode PD connect the control element uPDP via couplers to the optical line OL to send and receive, respectively, auxiliary data AD to and from the optical line termination OLT. The control element uPDP according to the invention is adapted to handle data for an auxiliary data path ADP to and from an optical network termination ONT.

Figure 4:
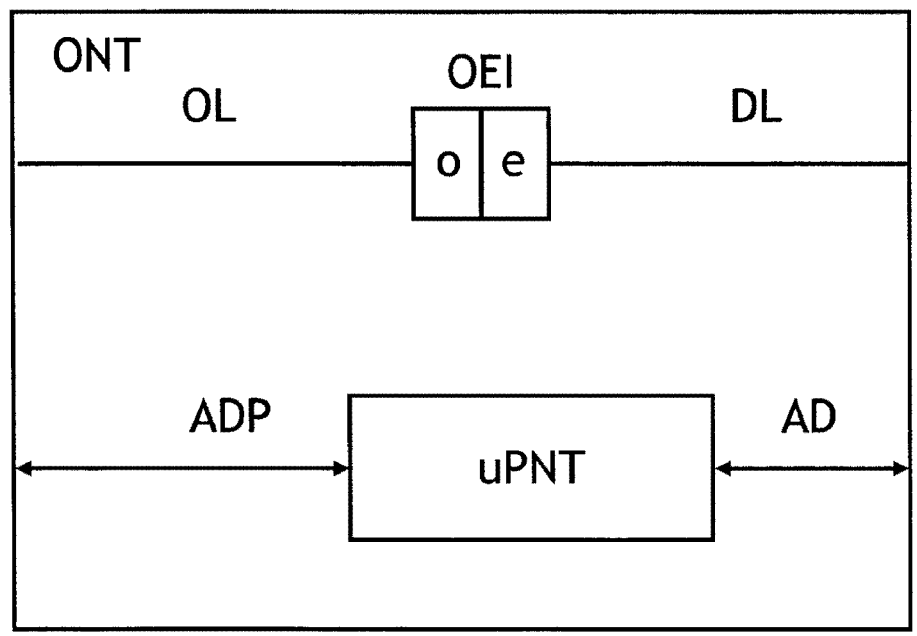
FIG. 4 shows a block diagram of a subscriber-sided network termination unit according to the invention.

An example of such optical network termination ONT is shown in FIG. 4. It mainly includes a bidirectional optical-to-electrical interface OEI and a control element uPNT. The bidirectional optical-to-electrical interface OEI between an optical line OL and a data line DL has the same functions as and may be built like bidirectional optical-to-electrical interfaces in known optical network terminations. Auxiliary data AD present in the data streams on the optical line OL need not be considered in this bidirectional optical-to-electrical interface OEI. They are dealt with by the control element uPNT, that according to the invention controls the auxiliary data AD coming via the auxiliary data path ADP from the network-sided network termination unit or demarcation point device DPD.

The invention claimed is:

1. Method for performing network access functions for a subscriber-sided network access unit in a telecommunication's access network with a central unit, a distribution network, and a multiple of network-sided network termination units with subscriber-sided network access units connectable comprising:

transmitting first bidirectional communications on a first bidirectional communication path between the central unit and that network-sided network termination unit, to which the subscriber-sided network access unit is connectable, wherein the network-sided network termination unit is network equipment that remains under the sole control of a network operator, the network-sided network termination unit including a control element, a pass-through optical line and an auxiliary data path;

transmitting second bidirectional communications on a second bidirectional communication path between the subscriber-sided network access unit and the corresponding network-sided network termination unit in connection with the bidirectional communication path between the central unit and that network-sided network termination unit;

performing network access functions on the subscriber-sided network access unit using the first and second bidirectional communications, the network access functions being functions that one of allow and disallow the subscriber-sided network access unit to access the access network in order to send and receive data payload packets to and from the network, the transmitting of the first and second bidirectional communications and the performing of the network functions being performed without a need for user input at the subscriber-sided network access unit; and transmitting data payload packets between the central unit and the subscriber-sided network access unit using the pass-through optical line if the subscriber-sided network access unit is connected to the access network, the first bidirectional communication path including the control element and the pass-through optical line and the second bidirectional communication path including the control element and the auxiliary data path.

2. The method of claim 1, wherein the network access functions include at least one of allocating ports, addresses or physical paths within the network, revoking access authorization in the event of malpractice, assigning a special access code for temporary access of unknown users to the network, and sending emergency calls from unknown equipment.

3. The method of claim 2, wherein the network access function is performed prior to the subscriber-sided network access unit being assigned to a subscriber's data record in order to be connected to and registered with the network in order to allow the subscriber-sided network access unit to send and receive data payload packets to and from the network.

4. The method of claim 2, wherein the network access function is performed after the subscriber-sided network access unit is connected to the network in order to send and receive data payload packets to and from the network.

5. The method of claim 1, the transmitting of the first and second bidirectional communications and the performing of the network functions being performed without a need for a user to input a code.

6. Telecommunication's access network with a central unit, a distribution network, and a multiple of network-sided network termination units with subscriber-sided network access units connectable thereto, in which network a bidirectional communication path is present between the central unit and that network-sided network termination unit to which the subscriber-sided network access unit is connectable, and for performing network access functions a further bidirectional communication path between the subscriber-sided network access unit and the corresponding network-sided network termination unit is foreseen in connection with the bidirectional communication path between the central unit and that network-sided network termination unit, the network access functions being functions that one of allow and disallow the subscriber-sided network access units to access the access network in order to send and receive data payload packets to and from the network, wherein the network-sided network termination unit is network equipment that remains under the sole control of a network operator, the network-sided network termination unit including a control element, a pass-through optical line and an auxiliary data path, wherein a creation of the bidirectional paths, and the performing of the network functions, being performed without a need for user input at the subscriber-sided network access unit, wherein a transmitting of the data payload packets occurs between the central unit and the subscriber-sided network access unit using the pass-through optical line if the subscriber-sided network access unit is connected to the access network, the first bidirectional communication path including the control element and the pass-through optical line and the second bidirectional communication path including the control element and the auxiliary data path.

7. The telecommunication access network of claim 6, wherein the network access functions include at least one of allocating ports, addresses or physical paths within the network, revoking access authorization in the event of malpractice, assigning a special access code for temporary access of unknown users to the network, and sending emergency calls from unknown equipment.

8. The telecommunication access network of claim 7, wherein the network access function is performed prior to the subscriber-sided network access unit being assigned to a subscriber's data record in order to be connected to and registered with the network in order to allow the subscriber-sided network access unit to send and receive data payload packets to and from the network.

9. The telecommunication access network of claim 7, wherein the network access function is performed after the subscriber-sided network access unit is connected to the network in order to send and receive data payload packets to and from the network.

10. The telecommunications access network of claim 6, wherein the creation of the bidirectional paths, and the performing of the network functions, are performed without a need for a user to input a code.

11. Central unit for a telecommunication's access network with a central unit, a distribution network, and a multiple of network-sided network termination units with subscriber-sided network access units connectable thereto, in which network a bidirectional communication path is present between the central unit and the network-sided network termination unit, and the central unit includes communication means for operating a bidirectional communication path to a subscriber-sided network access unit via a network-sided network termination unit, to which said subscriber-sided network access unit is connectable, in order to allow the central unit to perform network access functions on the subscriber-sided network access unit, the network access functions being functions that one of allow and disallow the subscriber-sided network access unit to access the access network in order to send and receive data payload packets to and from the network, wherein the network-sided network termination unit is network equipment that remains under the sole control of a network operator, the network-sided network termination unit including a control element, a pass-through optical line and an auxiliary data path,
wherein a creation of the bidirectional paths, and the performing of the network functions, being performed without a need for user input at the subscriber-sided network access unit,
wherein a transmitting of the data payload packets occurs between the central unit and the subscriber-sided network access unit using the pass-through optical line if the subscriber-sided network access unit is connected to the access network, the first bidirectional communication path including the control element and the pass-through optical line and the second bidirectional communication path including the control element and the auxiliary data path.

12. The central unit of claim 11, wherein the communication means is configured to perform a network access function on the subscriber-sided network access unit, the network access function including at least one of allocating ports, addresses or physical paths within the network, revoking access authorization in the event of malpractice, assigning a special access code for temporary access of unknown users to the network, and sending emergency calls from unknown equipment.

13. The central unit of claim 12, wherein the network access function is performed prior to the subscriber-sided network access unit being assigned to a subscriber's data record in order to be connected to and registered with the network in order to allow the subscriber-sided network access unit to send and receive data payload packets to and from the network.

14. The central unit of claim 12, wherein the network access function is performed after the subscriber-sided network access unit is connected to the network in order to send and receive data payload packets to and from the network.

15. The central unit of claim 11, wherein the creation of the bidirectional paths, and the performing of the network functions, are performed without a need for a user to input a code.

16. Network-sided network termination unit for a telecommunication's access network with a central unit, a distribution network, and a multiple of network-sided network termination units with subscriber-sided network access units connectable thereto, in which network a bidirectional communication path is present between the central unit and the network-sided network termination unit, and the network-sided network termination unit includes communication means for operating a bidirectional communication path to a subscriber-sided network access unit connectable thereto, in order to perform network access functions on the subscriber-sided network access unit, the network access functions being functions that one of allow and disallow the subscriber-sided network access unit to access the access network in order to send and receive data payload packets to and from the network, wherein the network-sided network termination unit is network equipment that remains under the sole control of a network operator, the network-sided network termination unit including a control element, a pass-through optical line and an auxiliary data path,
wherein a creation of the bidirectional paths, and the performing of the network functions, being performed without a need for user input at the subscriber-sided network access unit,
wherein a transmitting of the data payload packets occurs between the central unit and the subscriber-sided network access unit using the pass-through optical line if the subscriber-sided network access unit is connected to the access network, the first bidirectional communication path including the control element and the pass-through optical line and the second bidirectional communication path including the control element and the auxiliary data path.

17. The network-sided network termination unit of claim 16, wherein the communication means is configured to perform a network access function on the subscriber-sided network access unit, the network access function including at least one of allocating ports, addresses or physical paths within the network, revoking access authorization in the event of malpractice, assigning a special access code for temporary access of unknown users to the network, and sending emergency calls from unknown equipment.

18. The network-sided network termination unit of claim 17, wherein the network access function is performed prior to the subscriber-sided network access unit being assigned to a subscriber's data record in order to be connected to and registered with the network in order to allow the subscriber-sided network access unit to send and receive data payload packets to and from the network.

19. The network-sided network termination unit of claim 17, wherein the network access function is performed after the subscriber-sided network access unit is connected to the network in order to send and receive data payload packets to and from the network.

20. The network-sided network termination unit of claim 16, wherein the creation of the bidirectional paths, and the performing of the network functions, are performed without a need for a user to input a code.

21. Subscriber-sided network access unit for a telecommunication's access network with a central unit, a distribution network, and a multiple of network-sided network termination units with subscriber-sided network access units connectable thereto, in which network a bidirectional communication path is present between the central unit and that network-sided network termination unit, to which the subscriber-sided network access unit is connectable, and the subscriber-sided network access unit includes communication means for operating a bidirectional communication path to a network-sided network termination unit connectable thereto, in order to perform network access functions on the subscriber-sided network access unit, the network access functions being functions that one of allow and disallow the subscriber-sided network access unit to access the access network in order to send and receive data payload packets to and from the network, wherein the network-sided network termination unit is network equipment that remains under the sole control of a network operator, the network-sided network termination unit including a control element, a pass-through optical line and an auxiliary data path, wherein a creation of the bidirectional paths, and the performing of the network functions, being performed without a need for user input at the subscriber-sided network access unit, wherein a transmitting of the data payload packets occurs between the central unit and the subscriber-sided network access unit using the pass-through optical line if the subscriber-sided network access unit is connected to the access network, the first bidirectional communication path including the control element and the pass-through optical line and the second bidirectional communication path including the control element and the auxiliary data path.

22. The subscriber-sided network access unit of claim 21, wherein the communication means is configured to perform a network access function on the subscriber-sided network access unit, the network access function including at least one of allocating ports, addresses or physical paths within the network, revoking access authorization in the event of malpractice, assigning a special access code for temporary access of unknown users to the network, and sending emergency calls from unknown equipment.

23. The subscriber-sided network access unit of claim 22, wherein the network access function is performed prior to the subscriber-sided network access unit being assigned to a subscriber's data record in order to be connected to and registered with the network in order to allow the subscriber-sided network access unit to send and receive data payload packets to and from the network.

24. The subscriber-sided network access unit of claim 22, wherein the network access function is performed after the subscriber-sided network access unit is connected to the network in order to send and receive data payload packets to and from the network.

25. The subscriber-sided network access unit of claim 21, wherein the creation of the bidirectional paths, and the performing of the network functions, are performed without a need for a user to input a code.

\* \* \* \* \*